(12) United States Patent
Boardman et al.

(10) Patent No.: US 11,555,935 B2
(45) Date of Patent: Jan. 17, 2023

(54) COMPRESSIVE IMAGING METHOD AND SYSTEM COMPRISING A DETECTOR, A MASK, AND A DRIVE FOR ROTATING THE MASK ABOUT AT LEAST ONE OF ONE OR MORE AXES OF ROTATIONAL SYMMETRY

(71) Applicant: Australian Nuclear Science and Technology Organisation, New South Wales (AU)

(72) Inventors: David Boardman, New South Wales (AU); Mathew Guenette, New South Wales (AU); Alison Flynn, New South Wales (AU); Adam Sarbutt, New South Wales (AU); Lachlan Chartier, New South Wales (AU); Jayden Ilter, New South Wales (AU); Dale Prokopovich, New South Wales (AU); Geoff Watt, New South Wales (AU)

(73) Assignee: Australian Nuclear Science and Technology Organisation, New South Wales (AU)

( * ) Notice: Subject to any disclaimer, the term of this patent is extended or adjusted under 35 U.S.C. 154(b) by 55 days.

(21) Appl. No.: 16/756,355

(22) PCT Filed: Oct. 22, 2018

(86) PCT No.: PCT/AU2018/051144
§ 371 (c)(1),
(2) Date: Apr. 15, 2020

(87) PCT Pub. No.: WO2019/075531
PCT Pub. Date: Apr. 25, 2019

(65) Prior Publication Data
US 2021/0199819 A1    Jul. 1, 2021

(30) Foreign Application Priority Data
Oct. 20, 2017 (AU) .............................. 2017904259

(51) Int. Cl.
*G01T 1/20* (2006.01)
*G01T 1/24* (2006.01)
(Continued)

(52) U.S. Cl.
CPC ............... *G01T 1/295* (2013.01); *G01T 1/20* (2013.01); *G01T 1/24* (2013.01); *G01T 1/2992* (2013.01);
(Continued)

(58) Field of Classification Search
CPC ......... G01T 1/295; G01T 1/20; G01T 1/2006; G01T 1/2018; G01T 1/20182;
(Continued)

(56) References Cited

U.S. PATENT DOCUMENTS 2,530,517 A * 11/1950 Fua ..................... G01N 23/083
378/2
3,700,895 A * 10/1972 Dicke .................... G03B 42/02
378/2
(Continued)

FOREIGN PATENT DOCUMENTS

JP    2005321390    11/2005
JP    2014500962    1/2014
(Continued)

OTHER PUBLICATIONS

Richard Obermeier and Jose Angel Martinez-Lorenzo, Sensing Matrix Design via Mutual Coherence Minimization for electromagnetic Compressive Imaging Applications, IEEE Transactions on Computational Imaging, vol. 3, No. 2, Jun. 2017. (Year: 2017).*
(Continued)

*Primary Examiner* — Allen C. Ho
(74) *Attorney, Agent, or Firm* — Kilpatrick Townsend & Stockton LLP

(57) ABSTRACT

A mask for use in compressed sensing of incoming radiation includes a material that modulates an intensity of incoming
(Continued)

radiation, a plurality of mask aperture regions, and one or more axes of rotational symmetry with respect to the mask aperture regions. Each mask aperture region includes at least one mask aperture that allows a higher transmission of the incoming radiation relative to other portions of the mask aperture region. The relative transmission sufficient to allow a reconstruction of compressed sensing measurements and has a shape that provides a symmetry under rotation about the one or more axes of rotational symmetry. A mutual coherence of a sensing matrix generated by a rotation of the plurality of mask aperture regions is less than one. An imaging system for compressed sensing of incoming radiation including such a mask is also provided.

16 Claims, 11 Drawing Sheets

(51) Int. Cl.
*G01T 1/36* (2006.01)
*G21K 1/02* (2006.01)
*G21K 1/04* (2006.01)
*G01T 1/29* (2006.01)

(52) U.S. Cl.
CPC ............... *G01T 1/36* (2013.01); *G01T 1/362* (2013.01); *G01T 1/365* (2013.01); *G01T 1/366* (2013.01); *G21K 1/04* (2013.01); *G21K 1/043* (2013.01)

(58) Field of Classification Search
CPC ... G01T 1/20183; G01T 1/20185; G01T 1/24; G01T 1/243; G01T 1/248; G01T 1/36; G01T 1/362; G01T 1/365; G01T 1/366; G21K 1/02; G21K 1/04; G21K 1/043
USPC ......... 378/2, 98.8, 145–151, 62; 250/370.09, 250/363.01, 363.02, 363.03, 363.04, 250/363.06
See application file for complete search history.

(56) References Cited

U.S. PATENT DOCUMENTS

| | | | | |
|---|---|---|---|---|
| 3,801,785 A * | 4/1974 | Barrett | ................. | G03B 42/026 378/2 |
| 4,075,483 A * | 2/1978 | Tancrell | ................. | G01T 1/295 250/363.06 |
| 4,078,177 A * | 3/1978 | Tiemens | ................. | A61B 6/025 378/23 |
| 4,209,780 A * | 6/1980 | Fenimore | ................. | G01T 1/295 250/363.06 |
| 4,228,420 A * | 10/1980 | Fenimore | ................. | G01T 1/295 378/2 |
| 4,241,404 A * | 12/1980 | Lux | ................. | G21K 1/043 378/2 |
| 4,246,483 A * | 1/1981 | Weiss | ................. | A61B 6/025 378/193 |
| 4,360,273 A * | 11/1982 | Thaxter | ................. | G03F 9/7076 356/401 |
| 4,677,681 A * | 6/1987 | Klausz | ................. | A61B 6/025 250/363.07 |
| 6,737,652 B2 * | 5/2004 | Lanza | ................. | G01T 1/295 250/237 R |
| 7,283,231 B2 * | 10/2007 | Brady | ................. | G06T 9/00 356/303 |
| 7,312,460 B2 * | 12/2007 | Geri | ................. | G01T 1/169 250/393 |
| 7,339,170 B2 * | 3/2008 | Deliwala | ................. | G01J 3/02 250/351 |
| 7,463,712 B2 * | 12/2008 | Zhu | ................. | A61B 6/5282 378/2 |
| 7,476,863 B2 * | 1/2009 | Lamadie | ................. | G01T 1/295 250/237 R |
| 7,623,614 B2 * | 11/2009 | Shefsky | ................. | G01N 23/02 378/2 |
| 8,194,821 B2 * | 6/2012 | Seppi | ................. | G21K 1/10 378/62 |
| 8,199,244 B2 | 6/2012 | Baraniuk et al. | | |
| 8,519,343 B1 | 8/2013 | Mihailescu et al. | | |
| 9,783,880 B2 * | 10/2017 | Lin | ................. | C23C 10/30 |
| 10,224,175 B2 * | 3/2019 | Stevens | ................. | G03F 7/30 |
| 10,795,036 B2 * | 10/2020 | Boardman | ............. | G01T 1/161 |
| 2006/0261278 A1 | 11/2006 | Accorsi | | |
| 2008/0095298 A1 | 4/2008 | Shefsky | | |

FOREIGN PATENT DOCUMENTS

| | | |
|---|---|---|
| JP | 2017522543 | 8/2017 |
| RU | 2467355 | 11/2012 |
| WO | 2015176115 | 11/2015 |

OTHER PUBLICATIONS

Michael L. Don et al., Compressive imaging via a rotating coded aperture, Applied Optics, vol. 56, No. 3, Jan. 20, 2017. (Year: 2017).*
Candes et al., "Robust Uncertainty Principles: Exact Signal Reconstruction From Highly Incomplete Frequency Information," IEEE Transactions on Information Theory, vol. 52, No. 2, Jun. 2004, 41 pages.
Daubechies et al., "An Iterative Thresholding Algorithm for Linear Inverse Problems with a Sparsity Constraint," Communications on Pure and Applied Mathematics, vol. 57, No. 11, Aug. 26, 2004, pp. 1413-1457.
Donoho, "Compressed Sensing," IEEE Transactions on Information Theory, vol. 52, No. 4, Sep. 14, 2004, 34 pages.
Donoho, "For most Large Underdetermined Systems of Equations, the Minimal L1-Norm Near-Solution Approximates the Sparsest Near-Solution," Technical Report No. 2004-10, Stanford University, Jul. 2004, 23 pages.
Donoho, "For Most Large Underdetermined Systems of Linear Equations the Minimal L1-norm Solution Is Also the Sparsest Solution," Communications on Pure and Applied Mathematics, vol. 59, No. 6, Jun. 2006, 33 pages.
Donoho et al., "Observed Universality of Phase Transitions in High-Dimensional Geometry, with Implications for Modern Data Analysis and Signal Processing," Available online at: https://arxiv.org/pdf/0906.2530.pdf, May 14, 2009, 47 pages.
Donoho et al., "Sparse Nonnegative Solution of Underdetermined Linear Equations by Linear Programming," Technical Report No. 2005-6, Stanford University, Mar. 2005, 19 pages.
Figueiredo et al., "Gradient Projection for Sparse Reconstruction: Application to Compressed Sensing and Other Inverse Problems," IEEE Journal of Selected Topics in Signal Processing, vol. 1, No. 4, Dec. 2007, pp. 586-597.
Gini, "Measurement of Inequality of Incomes," The Economic Journal, vol. 31, No. 121, Mar. 1921, pp. 124-126.
Hurley et al., "Comparing Measures of Sparsity," Available online at: https://arxiv.org/pdf/0811.4706.pdf, Apr. 27, 2009, 16 pages.
Lopes, "Estimating Unknown Sparsity in Compressed Sensing," Proceedings of the 30th International Conference on Machine Learning, vol. 28, 2013, 9 pages.
Lopes, "Unknown Sparsity in Compressed Sensing: Denoising and Inference," IEEE Transactions on Information Theory, vol. 62, No. 9, Sep. 2016, pp. 5145-5166.
Monajemia et al., "Deterministic Matrices Matching the Compressed Sensing Phase Transitions of Gaussian Random Matrices," Proceedings of the National Academy of Sciences of the U.S.A., vol. 110, No. 4, Jan. 22, 2013, pp. 1181-1186.
International Application No. PCT/AU2018/051144 , International Search Report and Written Opinion, dated Nov. 13, 2018, 10 pages.

(56) References Cited

OTHER PUBLICATIONS

Rickard et al., "The Gini Index of Speech," University College Dublin, Jan. 2004, 5 pages.
RU2020116355, "Search Report", dated Nov. 2, 2021, 4 pages.
Application No. JP2020-521916, Office Action, dated May 31, 2022, 8 pages.
Mimura, "Compressed Sensing—Sparse Recovery and its Algorithms", Lecture and Research Record of Research Institute for Mathematical Sciences, vol. 1803, Aug. 2012, pp. 26-56, 33 pages.

* cited by examiner

COMPRESSIVE IMAGING METHOD AND SYSTEM COMPRISING A DETECTOR, A MASK, AND A DRIVE FOR ROTATING THE MASK ABOUT AT LEAST ONE OF ONE OR MORE AXES OF ROTATIONAL SYMMETRY

RELATED APPLICATION

The present application is a U.S. 371 Application of International Application No. PCT/AU2018/051144, filed Oct. 22, 2018, which application claims the benefit of the filing and priority dates of Australian patent application no. 2017904259, filed Oct. 20, 2017, the contents of which are hereby incorporated by reference in their entirety for all purposes.

FIELD OF THE INVENTION

The invention relates to a compressive imaging method and system, of particular but by no means exclusive application in the gamma-ray imaging of radioactive sources or material.

BACKGROUND OF THE INVENTION

WO 2015/176115 discloses a mask apparatus for use in compressed sensing of incoming radiation, such as gamma-ray radiation. The mask apparatus comprises one or more coded masks, each of the masks having a body of a material that modulates the intensity of the incoming radiation. The masks have a plurality of mask aperture regions that allow a higher transmission of the radiation relative to other portions of the one or more coded masks sufficient to allow compressed sensing measurements. WO 2015/176115 illustrates, for example, a nested pair of spherical, hemispherical or cylindrical masks, and a spherical mask nested within a hemispherical mask.

SUMMARY OF THE INVENTION

According to a first broad aspect of the invention, there is provided a mask for use in compressed sensing of incoming radiation, comprising:
- a material that modulates an intensity of incoming radiation (such as by attenuating the incoming radiation or through scattering away at least some of the incoming radiation);
- a plurality of mask aperture regions (such as faces or portions of faces); and
- one or more axes of rotational symmetry with respect to the plurality of mask aperture regions;
- wherein each mask aperture region comprises at least one mask aperture (or window) that allows a higher transmission of the incoming radiation relative to other portions of the mask aperture region, the relative transmission being sufficient to allow a reconstruction of compressed sensing measurements, has a shape that provides a symmetry under rotation about the one or more axes of rotational symmetry; and
- a mutual coherence of a sensing matrix generated by a rotation of the plurality of mask aperture regions is less than one.

It should be appreciated that a mask aperture (i.e. where an aperture location is 'open') may still include some material (of the mask or otherwise), but constitutes an aperture in that it provides a higher transmission of the radiation than the 'closed' aperture locations. This may be effected by providing the same material as that that closes the 'closed' apertures but thinner, or a different material that is more transmissive of the incident radiation. In such embodiments the apertures may be compared to glazed windows—that is, at least partially transmissive. In other embodiments, however, the mask apertures may be provided by omitting or removing any material entirely (cf. unglazed windows). Herein, both are termed 'apertures' or 'open' aperture locations.

Thus, geometries with one or more (and generally plural) axes of rotational symmetry offer advantages over existing approaches. In various embodiments, only a single mask is required, and imaging may be conducted in all directions (viz. effectively $4\pi$ or omnidirectional imaging). A single mask implies cost savings for the manufacture of the imaging device and reduced system weight.

The mutual coherence of the sensing matrix may be expressed as $\mu(\phi)$, where:

$$\mu(\phi) = \max_{i \neq j} |\varphi_i^T \varphi_j|,$$

where $\varphi$ is a matrix containing $M \times N^2$ rows of the sensing matrix, arising from M measurements and an $N^2$ pixel image.

Alternatively, the mutual coherence of the sensing matrix may be expressed as $\mu(\varphi)$, where:

$$\mu(\varphi) = \max_{i \neq j} \frac{|\varphi_i^T \varphi_j|}{\|\varphi_i\|_2 \|\varphi_j\|_2},$$

where $\varphi$ is a matrix containing $M \times N^2$ rows of the sensing matrix, arising from M measurements and an $N^2$ pixel image. $\varphi_i$ and $\varphi_j$ are columns of $\varphi$.

In an embodiment, the mutual coherence of the sensing matrix is a minimized mutual coherence, that is, has been minimized by a suitable technique.

The mask may be a cube (with three axes of rotational symmetry) or other Platonic solid (viz. tetrahedron, octahedron, dodecahedron or icosahedron). Alternatively, the mask may be a truncated icosahedron or other Archimedean solid (i.e. with faces of two or more types of regular polygons). Indeed, in one embodiment, the mask is a sphere, wherein the mask aperture regions are defined such that the mask has the one or more axes of rotational symmetry with respect to the mask aperture regions.

According to a second broad aspect of the invention, there is provided a detector for compressed sensing of incoming radiation, the detector comprising:
- a mask according to the above-described first aspect;
- one or more radiation sensors within the mask and sensitive to the incoming radiation; and
- a drive for rotating the mask about at least one of the one or more axes of rotational symmetry.

In an embodiment, the detector further comprises a plurality of radiation sensors and a radiation shield arranged to mutually shield the plurality of radiation sensors.

According to this aspect, there is also provided a radiation detection method, comprising making compressed sensing measurements with a detector according to this aspect.

This aspect also provides an imaging system for compressed sensing of incoming radiation, the imaging system comprising:

a mask according to the above-described first aspect;
one or more radiation sensors within the mask and sensitive to the incoming radiation; and
a drive for rotating the mask about at least one of the one or more axes of rotational symmetry.

The imaging system may comprise a plurality of radiation sensors and a radiation shield arranged to mutually shield the radiation sensors.

The imaging system may comprise one or more optical and/or infrared cameras.

According to this aspect, there is also provided an imaging method, comprising imaging with the imaging system of the second aspect.

The imaging method may further comprise making optical images and/or infrared images of the field of view of the imaging system or a portion thereof, and overlaying the optical images and/or infrared images and an image generated with the imaging system.

According to a third broad aspect, the invention provides a method of nuclear reactor decommissioning, radiation safety monitoring or surveying, radioactive waste characterisation, security or defence monitoring, medical imaging, radiotherapy, particle therapy, gamma-ray astronomy, X-ray astronomy, remote characterisation or detection of misalignments in a charged particle accelerator beam or in a radiation inducing beam, or border security, the method comprising a radiation detection method or an imaging method according to the second broad aspect.

According to this aspect, the invention also provides system for use in nuclear reactor decommissioning, radiation safety monitoring or surveying, radioactive waste characterisation, security or defence monitoring, medical imaging, radiotherapy, particle therapy, gamma-ray astronomy, X-ray astronomy, remote characterisation or detection of misalignments in a charged particle accelerator beam or in a radiation inducing beam, or border security, the system comprising a detector or an imaging system according to the second broad aspect.

It should be noted that any of the various individual features of each of the above aspects of the invention, and any of the various individual features of the embodiments described herein including in the claims, can be combined as suitable and desired. In addition, it is possible to provide various embodiments by combining appropriately a plurality of components disclosed in the disclosed embodiments. For example, some components may be deleted from the disclosed embodiments. Further, the components of different embodiments may be combined appropriately.

BRIEF DESCRIPTION OF THE DRAWING

In order that the invention may be better ascertained, embodiments will now be described, by way of example, with reference to the accompanying drawing in which.

DESCRIPTION OF EMBODIMENTS

Figure 1:
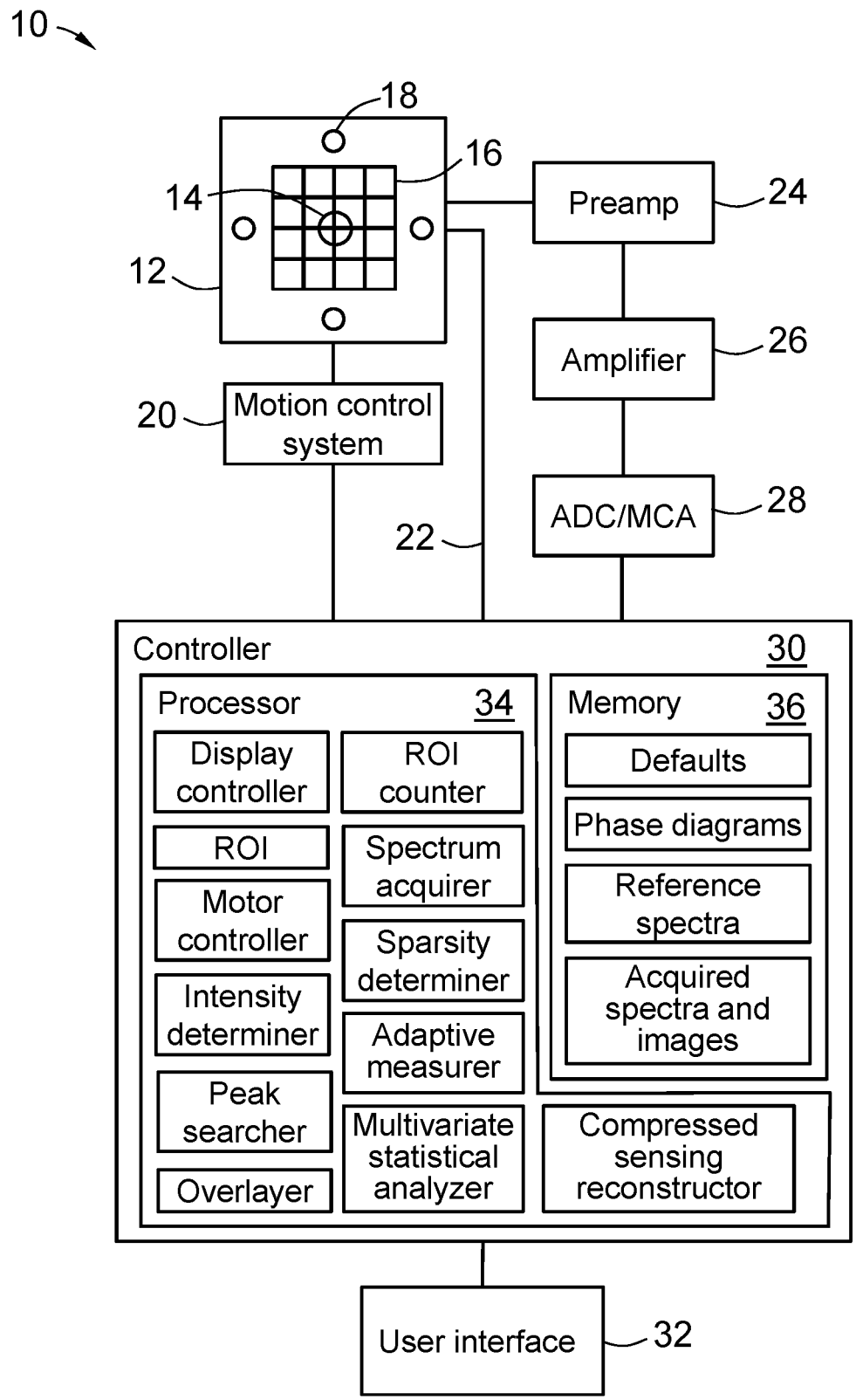
FIG. 1 is a schematic view of a radiation imaging system according to an embodiment of the present invention.

FIG. 1 is a schematic view of a radiation imaging system 10 according to an embodiment of the present invention. Imaging system 10 includes a detector 12, which itself includes one or more radiation sensors 14 (sensitive to, in this embodiment, gamma-ray radiation) with associated readout electronics, a mask 16 surrounding sensors 14 for facilitating compressed sensing of the incoming radiation (in this example, gamma-ray radiation), one or more (in this example, four) optical and/or infrared cameras 18 that cover, or can be rotated to cover, the full field of view of imaging system 10, and a distance information acquisition unit (not shown) comprising, for example, one or more laser range finders (e.g. LIDAR), structured light, ultrasound or stereoscopic cameras, for providing distance information concerning the local environment.

Radiation sensors 14 are mounted to the inner side of mask 16, in this example with a rod (not shown) that is attached to the inner side of mask 16. Desirably, this rod coincides with an axis of rotation of mask 16 (generally the inner most axis—as described below) to minimize the rotation of sensor signal and power cables. Such signals can be transmitted from detector 12 with such cables, or along the rod itself (with may be a compound rod), or wirelessly. Also, if such a rod is employed and it is of an attenuating material, the rod is desirably positioned to be anchored to the inner side of mask 16 at a location or locations with closed aperture locations.

In this example, the body of mask 16 is of generally cubic shape, each face thereof constituting a mask aperture region. Each mask aperture region (or face in this example) comprises a plurality of aperture locations, each of which may be 'open' (and may be termed a window or aperture—though in some examples may still have some attenuating material) or 'closed'. In this example, mask 16 is depicted with 4×4 aperture locations per face, but—as discussed below—other numbers of aperture locations can be used. An aperture location described as 'open' allows a higher transmission of the incoming radiation relative to the other (or 'closed') aperture locations of the respective mask aperture region. Both open and closed aperture locations may transmit at least some of the incoming radiation and/or attenuate the incoming radiation-provided the relative transmission is sufficient to allow reconstruction of the compressed sensing measurements.

Imaging system 10 is adapted to detect principally gamma-ray radiation, but it will be appreciated that in other embodiments the radiation sensors and the mask may be adapted for the detection and compressed sensing of other forms of radiation, or indeed of multiple forms of radiation. This may be accomplished by employing one or more sensors that are sensitive to a plurality of types of radiation (e.g. neutron and gamma-rays), or by employing a plurality of sensors with different radiation sensitivities. Likewise, a mask would be employed with different transmission/attenuation characteristics, selected according to the type or types of the incoming radiation of interest.

Imaging system 10 includes a motion control system 20 that includes one, two, three or more stepper motors (in this example, three), multi-turn encoders and motor drivers for controlling the motion (in this example, the rotation) of mask 16 such that the full range of rotational symmetries may be used. Imaging system 10 also includes an image data and control channel 22 for transmitting control signals to cameras 18 and receiving image data therefrom, and a preamplifier 24, an amplifier and an integrated ADC/MCA 28 that receive and process the output signals from radiation sensors 14.

Imaging system 10 includes a computing system (that may be embedded in or external to system 10) comprising a controller 30 (which receives and manipulates the image data from cameras 18 and the processed output signals from radiation sensors 14) and a user interface 32 (which includes an expert and a non-expert graphical user interface), for controlling data and image acquisition, controlling motion control system 20 and hence the motion of mask 16, analysing data, reconstructing compressed sensing measurements, generating radiation and optical/infrared image overlays, and performing radionuclide identification and quantification. Controller 30 is also used to control imaging system 10, via user interface 32. Imaging system 10 also includes a power supply that provides power to motion control system 20, detector 12, cameras 18, the distance information acquisition unit and the computing system.

More specifically, controller 30 includes a processor 34 and a memory 36. Processor 34 implements several components, including a display controller for controlling a display of user interface 32, a region of interest (ROI) module, a region of interest counter, a motor controller for controlling motion control system 20, an intensity determiner, an overlayer, a spectrum acquirer, a sparsity determiner, a peak searcher, a multivariate statistical analyzer (employing, for example, Principal Component Analysis and Fisher Linear Discriminant Analysis) for the analysis of radiation spectra collected with sensors 14, and an adaptive measurer for determining measurement time and number of measurements from metrics including: sparsity determination metrics, Mean Squared Error (MSE) metrics and compressed sensing phase transition data. Processor 34 also implements a compressed sensing reconstructor configured to reconstruct compressed sensing measurements. Furthermore, although in FIG. 1 preamplifier 24, amplifier 26 and ADC/MCA 28 are depicted as discrete components, but it should be understood that one or more of them may be internal to the computing system or implemented by controller 30.

Memory 36 stores default system parameters, phase diagrams (described below), reference spectra (for use by peak searcher to identify peaks in acquired spectra) and acquired spectra and images (collected by sensors 14 and cameras 18, respectively).

Optionally, imaging system 10 may include a water-proof or dust-proof case (not shown) located or locatable over detector 12 or mask 16 and transparent (or essentially so) to the radiation type(s) of interest.

Figure 2A:
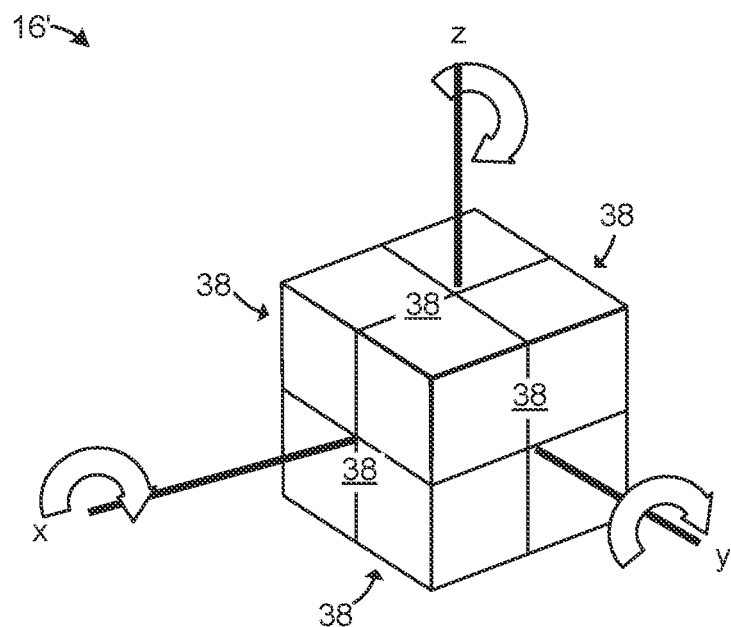
FIGS. 2A and 2B are schematic views of the mask of the system of FIG. 1, for use in compressed sensing of incoming radiation according to an embodiment of the present invention.
Figure 2B:
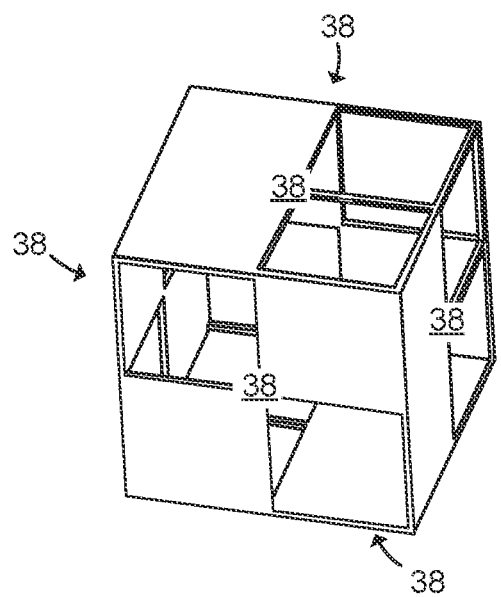

FIG. 2A is a schematic view of mask 16' (a variant of mask 16). As will be apparent, mask 16' has six mask aperture regions in the form of six faces 38, and three axes x, y, z of rotational symmetry. Mask 16', as depicted in this figure, has four apertures locations per face 38; each aperture location may or may not include an aperture, though there should be at least one aperture per face 38. This gives 24 mask aperture locations in total in this example. The different shades in FIG. 2A represent the 'closed' (i.e. low transmission) or 'open' (i.e. high transmission) state of each aperture location in each face 38 of mask 16'—darker implying lower transmission. FIG. 2B is another but less schematic view of mask 16', again according to the example with four aperture locations per face.

1. Rotational Symmetry

The geometry of mask 16 of system 10 constrains the one or more detectors 14 located within (and desirably at the approximate centre of) mask 16 to view different linear projections of the surrounding scene or environment and mask 16 is rotated about each axis x, y, z of rotational symmetry of mask 16. For each of these axes x, y, z, each of faces 38 can be rotated successively through 90°, resulting in four distinct orientations, which gives a total of 72 different mask patterns that can be generated. An overall mask pattern is desirably chosen that provides the lowest coherence between the phi matrix and the basis. The phi matrix (or sensing matrix) is a matrix representation of each of the whole mask patterns produced after each of the successive mask rotations. Each row of the phi matrix is one whole mask pattern and each column represents each mask aperture location. The values of the phi matrix represent the open/closed state (or level of transmission) of a particular aperture location. The basis represents the domain in which the signal is being sampled.

In alternative embodiments, each face 38 of mask 16 can be divided further, so that each face has—for example—3×3=9 apertures per face (providing a total of 9·6=54 mask aperture locations), 4×4=16 apertures per face (providing a total of 16×6=96 mask aperture locations) or 5×5=25 apertures per face (providing a total of 25×6=150 mask aperture locations). In general, therefore, a cubic mask with an n×n square array of aperture locations, where n=1, 2, 3, . . . , will have n×n×6 mask aperture locations (though it should be noted that the aperture locations need not be arranged as a square array—other arrangements are also acceptable). A larger number of aperture locations results in a smaller angular resolution of imaging system 10 with which the mask is used.

A comparable analysis may be made of other mask geometries. For example, a mask in the shape of an octahedron, with eight uniform faces and an n×n square array of aperture locations will have n×n×8 mask aperture locations. If the aperture locations are arranged so as to fill each triangular face of the octahedron such that, for example, each aperture location is itself triangular and of equal size, each face may have n×n, where n≥2, triangular aperture locations, or multiples (by 4, 16, 64, . . . ) thereof.

Figure 3:
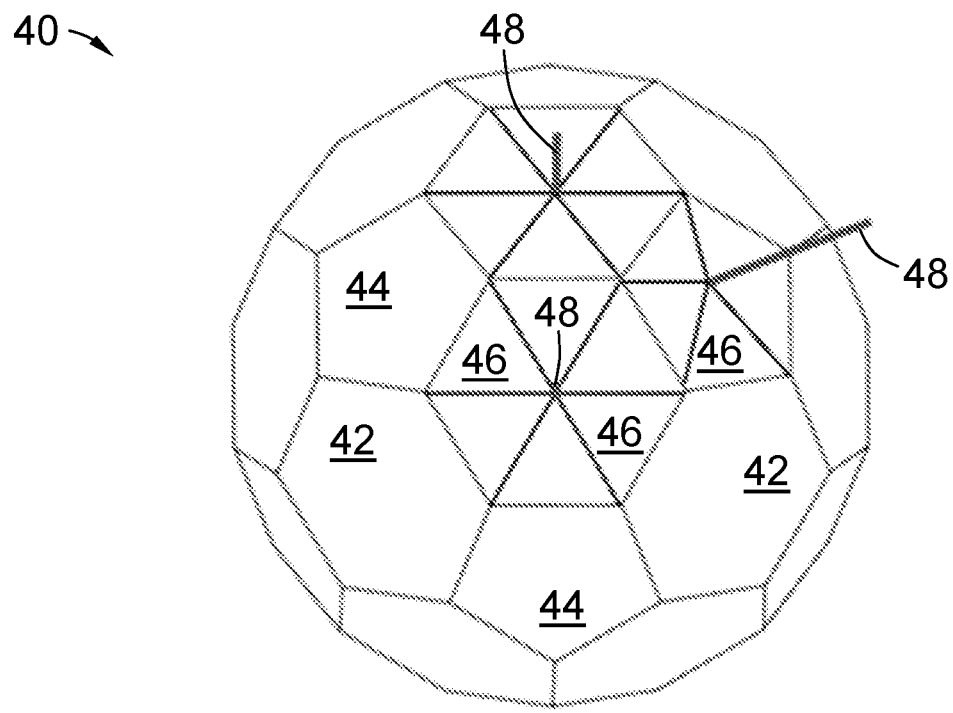
FIG. 3 is a schematic view of a truncated icosahedral mask for use in compressed sensing of incoming radiation according to an embodiment of the present invention.

The mask may conform to any shape with one or more axes of rotational symmetry. According to another embodiment, the imaging system includes a truncated icosahedral mask, as shown schematically in FIG. 3. FIG. 3 is a schematic view of a truncated icosahedron mask 40, showing that the hexagons 42 and pentagons 44 can be subdivided into triangular aperture locations 46 that may be open (not filled with attenuating material) or closed (filled with an attenuating material)—and further divided as desired. The lines 48 indicate three of the 60 axes of rotational symmetry; the truncated icosahedron has a symmetry order of 120.

In a certain embodiment, the truncated icosahedral pattern is provided on a sphere. Other mask shapes may include, but not be limited to, a dodecahedron, pyramid and a sphere. Some embodiments have the number of possible mask patterns equal to or greater than the number of mask aperture locations. This would provide the full sampling that may be required for low sparsity images, though having the possible number of mask patterns as less than the number of mask apertures would still work for sparse images. The advantage of having the number of possible mask patterns greater than the number of mask apertures is that the image could be oversampled, which may lead to benefits in image quality in some applications.

The shape of the mask apertures can be circular, square, triangular, rhombus or any other shape that provides symmetry after a rotation. That is, when a mask is rotated, a hexagon (for example) mask location is rotated to another hexagon mask location, and not to—say—a pentagon mask location.

Figure 4:
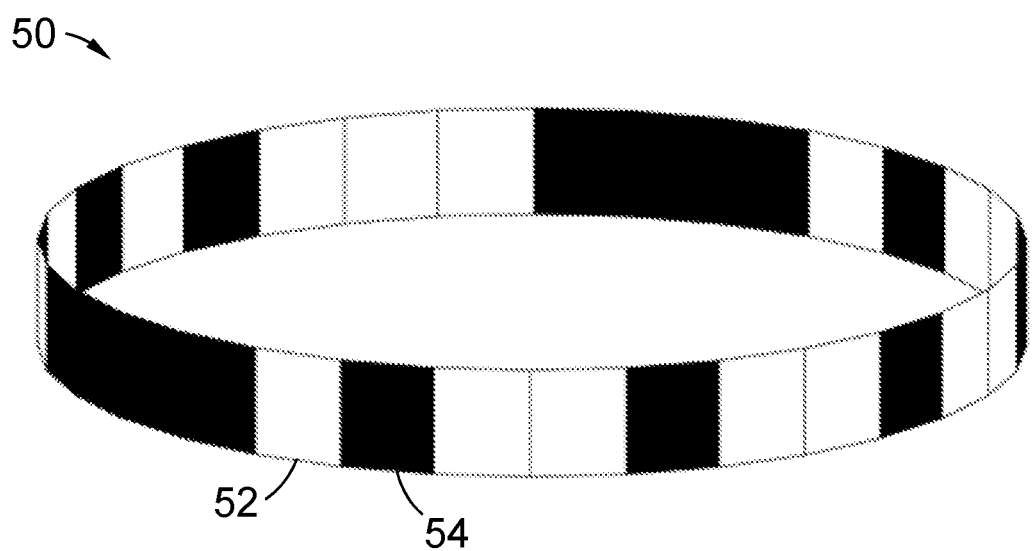
FIG. 4 is a schematic view of a cylindrical mask for use in compressed sensing of incoming radiation according to an embodiment of the present invention.

FIG. 4 is a schematic view of a mask 50 for use in compressed sensing of incoming radiation according to an embodiment of the present invention, in the form of cylinder (or quasi-cylinder comprising a plurality of flat faces) with a single row of aperture locations and only one axis of rotational symmetry. The number of possible measurements is equal to the number of columns or apertures locations of mask 50, each either open 52 or closed 54. An imaging system with mask 50 would be able to generate only a one-dimensional image. However, plural single row cylindrical masks and detector systems may be stacked in order to generate a two-dimensional image.

Figure 5:
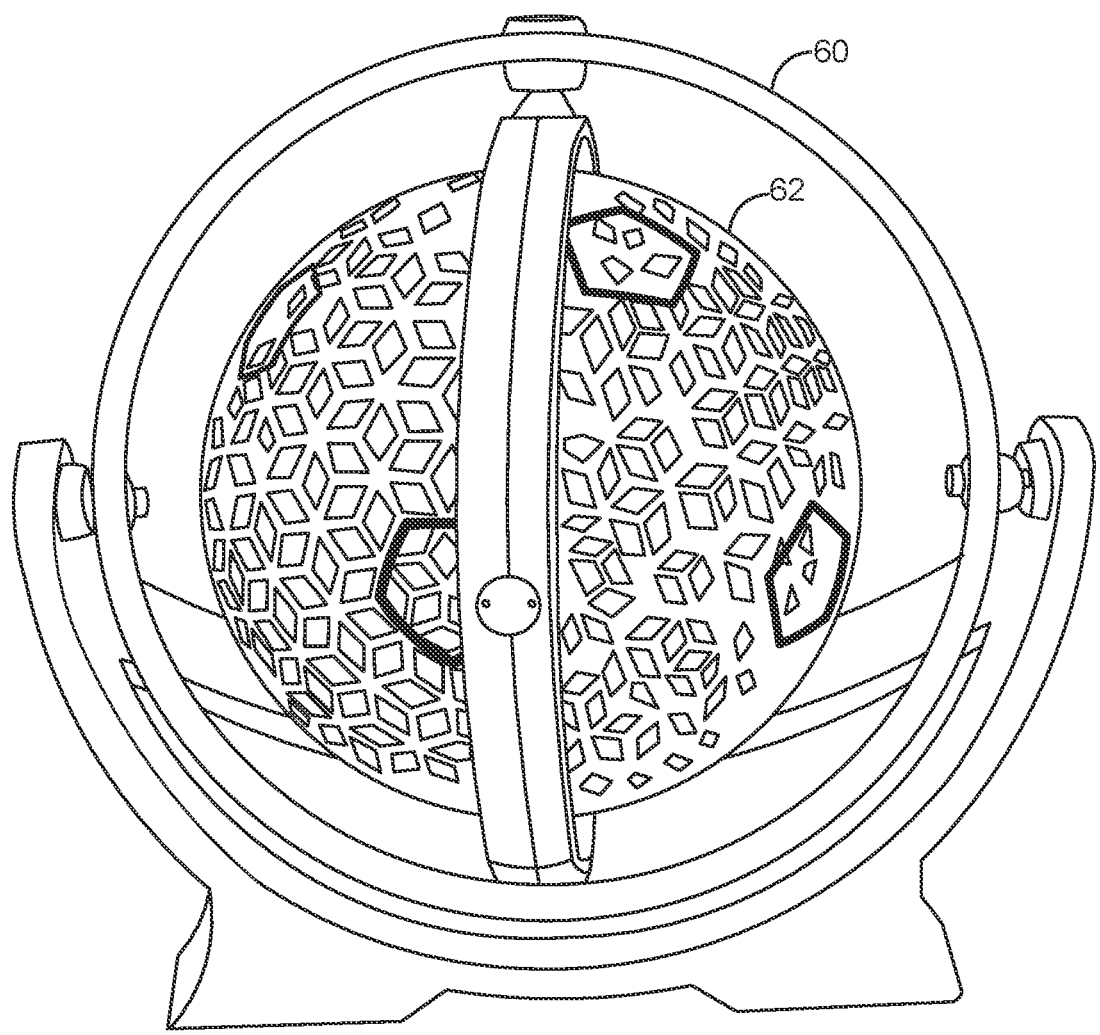
FIG. 5 is a view of an exemplary gimbal supporting a mask (such as a truncated icosahedral mask) in the imaging system of FIG. 1.

Mask 16 is supported by and positioned within a gimbal. FIG. 5 is a view of an example of a suitable gimbal 60 supporting a truncated icosahedral mask 62. In certain variants, gimbal 60 and/or motion control system 20 are contained within the mask, so that the orientation and movement of the mask are controlled from within the mask. In addition, in embodiments that employ a gimbal, motion control system 20 or motor controller of processor 34 may be configured to prevent undesired gimbal lock when using more than one degree of freedom.

Figure 6:
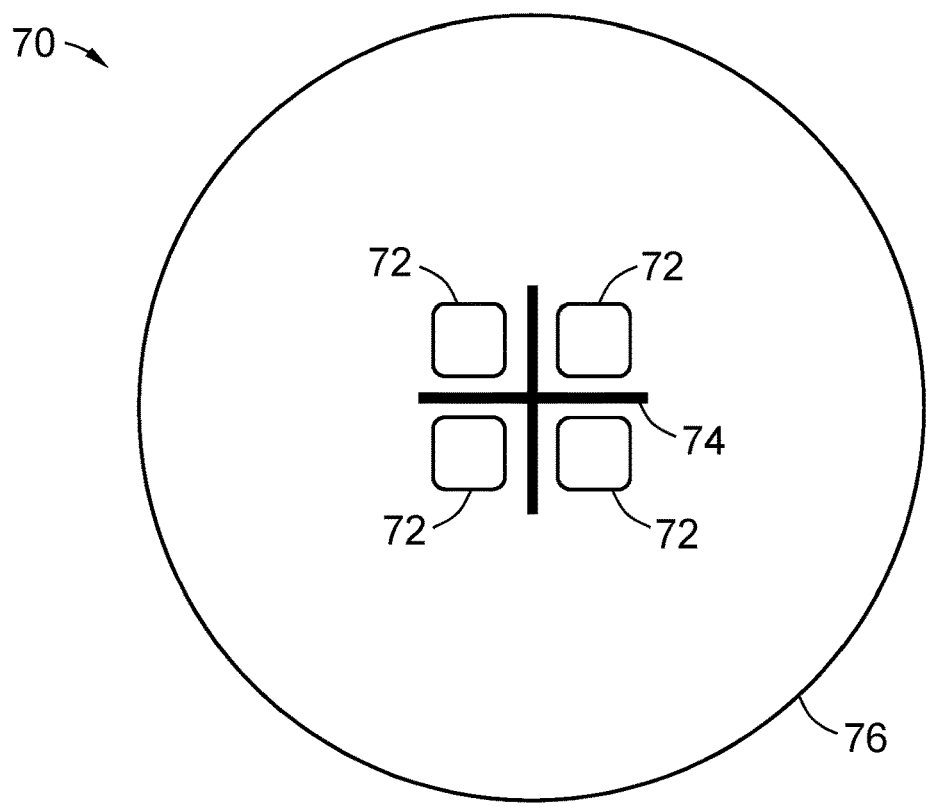
FIG. 6 is a schematic view of a plural sensor geometry with plural mutually shielded radiation sensors, for use in the radiation imaging system of FIG. 1.

In another embodiment, imaging system 10 includes plural (such as two, three or four) detectors, mutually shielded within the mask so that they each independently view a different region of the FOV (field-of-view). FIG. 6 is a schematic view of such a sensor geometry 70, in which four sensors 72 are shielded from each other's FOV by a cross-shaped, radiation absorbing shielding 74 within mask 76. In the illustrated example, mask 76 has a circular cross-section, but this technique may be employed with other mask geometries.

In this example, each of sensors 72 views at most a quarter of the FOV. In general, with n sensors, each of the sensors views at most 1/n of the FOV. The internal shielding 74 is configured to ensure that a single detector does not view (or minimally views) the signal from the remaining three quarters of the FOV. A Compton camera may be used to provide a form of electronic collimation which does not require the use of shielding materials.

An alternative method employs plural sensors, as in FIG. 6, but without shielding. In such a configuration, sensors (such as compound semiconductor and scintillator detectors) are employed that provide depth of interaction information so can be used to determine the direction of incident radiation. For example, low energy photons would interact near the surface of such a sensor, so the imaging system can be configured to determine that the radiation has not come from the opposite side of the sensor. Plural sensors positioned such that they maintain the original symmetry of the system can be used. Plural sensors, which do not maintain the original symmetry, can be used as long as the asymmetry is accurately modelled and accounted for in the image reconstruction process.

In general, there will be a trade-off between the number of masks, sensors and motors used in imagining systems according to embodiments of this invention.

The phi matrix generation method used to generate the phi matrix for masks 14, 40, 50, 76 according to these embodiments includes the following steps:
1) Generating the vertices of the mask shape
2) Defining the shape faces and/or the mask apertures (open or closed holes) from the vertices
3) Define the x, y and z rotational matrices and the angle to be rotated
4) Incrementally rotate the vertices with the desired rotational matrices, such that all rotational combinations are produced.
5) Compare the new face positions with those of the original orientation
6) Map the original face value, which in this case will be correlated to the transmission value for the mask aperture, across the different rotations
7) Generate the sensing (phi) matrix
8) Set the face values in the phi matrix to the associated transmission value for the mask aperture 2. Compressed Sensing The compressed sensing measurement process can be described by Equation 1:

$$y = \varphi x + \varepsilon, \quad (1)$$

where y is a M×1 vector of measurements, x is a $N^2 \times 1$ vector of the $N^2$ pixel image, 4 contains the $M \times N^2$ rows of the sensing matrix and ε is the noise term. The measurement process can also include a blur term, B, for the larger detector, for which Equation 1 becomes $$y = \varphi B x + \varepsilon. \quad (2)$$

The blur term, B, effectively represents the system point spread function (PSF) and can be determined (experimentally or through simulations) through measuring the system response for a point source in each of the source plane aperture (or sub-aperture) locations.

When operating in a different basis (such as wavelets), x can be substituted in Equation 1 or 2 with x=ψs, where ψ is the $N^2 \times N^2$ inverse basis transform matrix and s is the $N^2 \times 1$ vector of transform coefficients.

The reconstructed image is found through solving the convex optimization problem min $\|x\|_1$, subject to the constraint y=φx, which looks for object x having coefficients with the smallest $l_1$ norm that is consistent with the information y [1,2].

A large number of recovery algorithms have been proposed for finding sparse solutions to different formulations of the minimization problem described in the introduction. These recovery algorithms are generally classed into three main groups: convex, greedy and combinatorial algorithms. In the presence of noise in the measurements, the convex optimization problem can be written as $$\min_x \frac{1}{2}\|y - \varphi x\|_2^2 + \tau\|x\|_1 \quad (3)$$

where $\tau$ dictates the relative weighting between the two terms of the objective function. The first term of the objective function is an error term that looks at the difference between the solution and the observation, which enforces data consistency. The second term is the sparseness inducing $l_1$ norm regularization term, which encourages small components of x to become zero, thus promoting sparse solutions. Together, both terms seek to find a compressible solution that is consistent with the acquired data.

It has previously been shown that images can be reconstructed with high probability from $$M \geq cK\log\left(\frac{N^2}{K}\right) \quad (4)$$

random measurements, where c is a small constant and K is the level of sparsity (number of non-zero's) within the signal [1,2]. Therefore it is possible to sample signals at a rate proportional to their information content.

Determining the Restricted Isometry Property (RIP) of a sensing matrix is NP hard and is therefore impractical to calculate for compressive systems (though it be used to assess the quality of a mask pattern). The mutual coherence property, $\mu(\varphi)$, of the sensing matrix provides a mechanism for assessing the incoherence in the mask design:

$$\mu(\varphi) = \max_{i \neq j}|\varphi_i^T \varphi_j| \quad (5)$$

The mutual coherence provides a measure of the worst similarity between the columns of the phi matrix. Where each column of the phi matrix represents the open/closed state (or transmission) of a particular aperture location. If any two mask aperture locations are open and closed at the same time, throughout all the measurements, then they would be considered coherent and it would not be possible to say if a source of radiation resided in one of the other apertures. Desirably, the mask design is optimised to have a low coherence. Tens of thousands of random mask patterns (or more) can be generated and Equation (5) then used to evaluate the coherence of each pattern. The mask pattern with the lowest coherence will have the best quality and quickest reconstruction performance. A lower coherence mask allows for accurate image reconstruction using less measurements. The mutual coherence can also look at the degree of similarity between the phi matrix and the basis (i.e. wavelets). Other methods for generating a low coherence mask pattern may include generating an optimisation function, which outputs a low coherence mask pattern as the solution. Other mask patterns may include the Hadamard pattern or other patterns that are known to produce a small coherence value for the phi matrix.

There are a number of algorithms for solving the above convex optimization problem, including iterative thresholding and the Gradient Projection for Sparse Reconstruction (GPSR) [3, 4]. The GPSR reconstruction algorithm employs a gradient projection algorithm to solve Equation (1), and is the method employed herein, as it has been shown to outperform several other reconstruction methods [4].

The benefits of compressed sensing are that fewer measurements are required in order to generate an image when compared to traditional imaging techniques such as raster scanning, the pinhole camera and coded aperture. Compressive gamma-ray imaging techniques can also generate images with a very good/high signal to noise ratio.

3. Detectors/Multiple Sensors for Different Wavelengths & Particles/Gain Stability As discussed above, a sensor 14 may be a gamma-ray detector, a neutron detector, a UV detector, a dual gamma/neutron detector, a detector/receiver for any part of the EM spectrum or any particle, any combination of detectors that can provide multi-wavelength imaging (i.e. multiple UV detectors tessellated around a gamma/neutron detector). Any sensor 14 that detects the type or types of radiation of interest may be employed according to embodiments of the present invention. For wavelengths that can be focused, a lens may additionally be provided within (e.g. the centre of) the mask that focuses the incoming light onto a sensor in some other location within the mask. Such a lens may be required to focus light from the whole of the system field of view (FOV) and just part of the FOV.

An advantage of the described arrangements is that low cost non-position sensitive sensors can be used. However, position sensitive sensor arrays can still be used in embodiments of this invention. Another advantage is that standard geometries of sensors of conventional gamma-ray spectrometers can be used with the imaging system 10 (such as cylindrical, cube parallelepiped, planar, hemispherical, spherical sensors, etc). Hence, potential users may use existing non-directional spectrometers with the imaging system 10 in order to provide an imaging capability. The sensors used for gamma-ray imaging may include but are not limited to: NaI, LaBr, SrI2, CLYC, CLLBC, CsI, CeBr, LSO, LYSO, BGO, PbW, PVT, GM tube, HPGE, CdZnTe, CdTe, HgI2, CdMnTe, diamond, liquid scintillators, TlBr, gas detectors. The scintillator detectors may be coupled to a conventional Photomultiplier Tube (PMT) or a silicon photo multiplier (SiPM). Detectors such as CLYC, CLLBC. CdTe and CdZnTe can be used for dual gamma/neutron detection.

The scintillator detectors which use SiPM's, have the significant benefits of ruggedness, moderate cost, small physical size, good resolution, and operation at low bias voltages (of the order of tens of volts). However, the light output of these scintillators has a significant dependence upon temperature, at the negative %/° C. level, which means that peak shift due to ambient temperature change is a major problem when precision regions of interest need to be maintained. The signal output of such a detector system is a strong function of bias voltage. By using a temperature sensor in close proximity to the sensor, it is possible to use a scaled analogue voltage proportional to temperature to impose a positive temperature coefficient on the applied detector bias voltage, the scaling being so determined that the resulting positive temperature dependence of the bias voltage exactly compensates for the negative temperature dependence of the detector material. Such a method can provide gain stability during changes in temperature.

Different sensor gain stability methods may also be used, which include: LED stabilisation for a scintillator detector, using an embedded radiation source, calibrating the sensor response over the operational temperature range, maintaining the sensor at a constant temperature or any other method for gain stabilisation.

The present embodiment may incorporate a sensor (such as a GM tube, silicon sensor or any type of detector previously mentioned) that is outside of the mask and therefore its detected signal intensity is not influenced by the rotation of the mask. Such an embodiment would allow the system to compensate for any time dependent variations in the radiation field to the sensor or sensors within the mask that would otherwise interfere with the reconstruction process.

4. Large Detector and Deconvolution

Figure 7A:
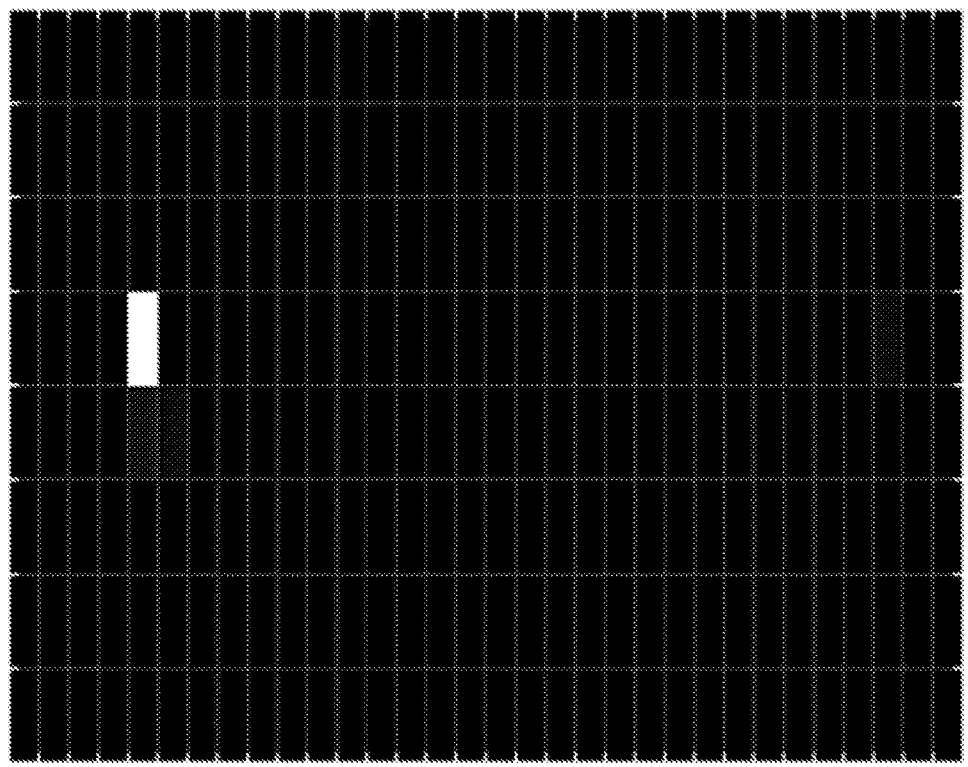
FIGS. 7A, 7B and 7C are reconstructed images for a point source measured with an imaging system according to the embodiment of FIG. 1, with a sensor that is, respectively, equal to or less than the size of a mask aperture, greater than the size of a mask aperture, and greater than the size of a mask aperture but the blurring by the PSF has been removed by the deconvolution process occurring during or after the compressed sensing reconstruction.
Figure 7B:
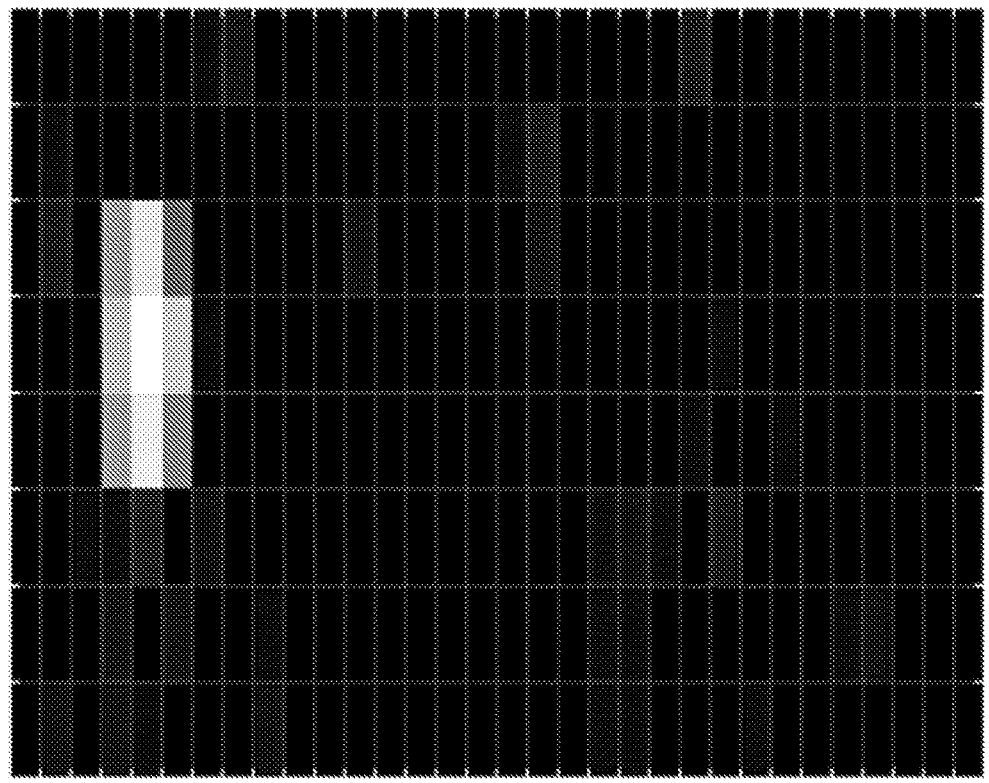

A reconstructed image generated experimentally by imaging system 10, with a sensor of sensitive area equal to or less than the size of the apertures, is shown in FIG. 7A. The source location falls within the centre of the field of view from one aperture. Some applications require short measurement times and therefore a high sensitivity. Such applications may include but not be limited to imaging the flow of commerce at ports of entry and medical imaging applications. Increases in the sensitivity can come through increases in the sensor volume and corresponding increases in the mask geometry. However, it may be advantageous to increase the sensor volume without the associated increase in mask geometry, i.e. to have a sensor that is larger than the size of a single mask aperture. Having a sensor larger than the size of an aperture causes a radiation source to be observed in a plurality of apertures. An experimentally obtained example of this effect is shown in FIG. 7B, where the central sensor covers 3×3 apertures from the perspective of the point radiation source location. The increase in detected system counts will come from the increased solid angle the sensor subtends to the radiation source and the increased attenuation of the thicker sensor (assuming the larger sensor is larger in all dimensions).

There are a number of ways in which the image deconvolution process could occur. Firstly, the blur function could be incorporated into the sensing matrix of the imaging system. This enables both the compressed sensing image reconstruction and deblurring/deconvolution to occur at the same time. Another advantage is that images for lower levels of radiation could be obtained. The downside to this method is that it can degrade the coherence of the sensing matrix, and the imaging process may require more measurements, more iterations of the reconstruction algorithm and a longer reconstruction time.

A second approach involves reconstructing a blurred image directly through the compressed sensing approach and then to perform the deconvolution of the PSF separately through the Richardson-Lucy method. Maximum Likelihood Expectation Maximisation or some other method. A disadvantage to this approach is that a point source now has a less sparse response (K=9 rather than K=1, in the example given above), which would require more measurements.

A third approach involves using a compressive deconvolution method which utilises another term in the objective function of equation 3, and directs the reconstruction to include a deblurring step. The resulting effect of any one of these methods is to produce an image such as that of FIG. 7C, which is similar to the small image shown in FIG. 7A, although it is expected that some image artefacts/blurring may reside in the deblurred imaged.

Figure 7C:
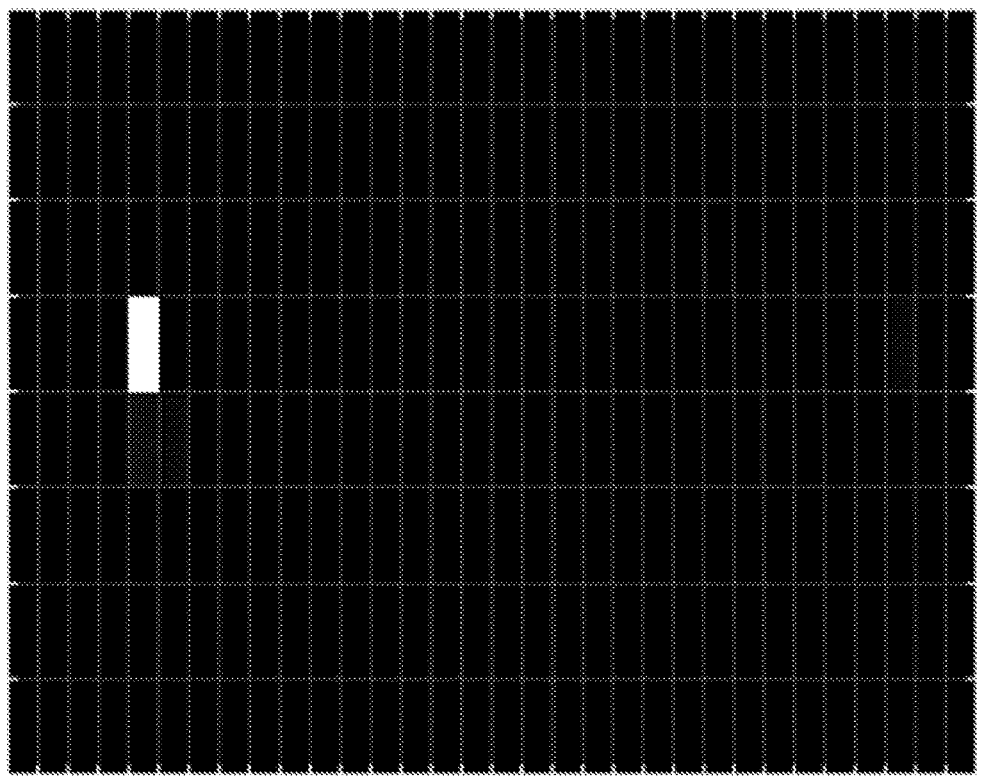
Figure 8A:
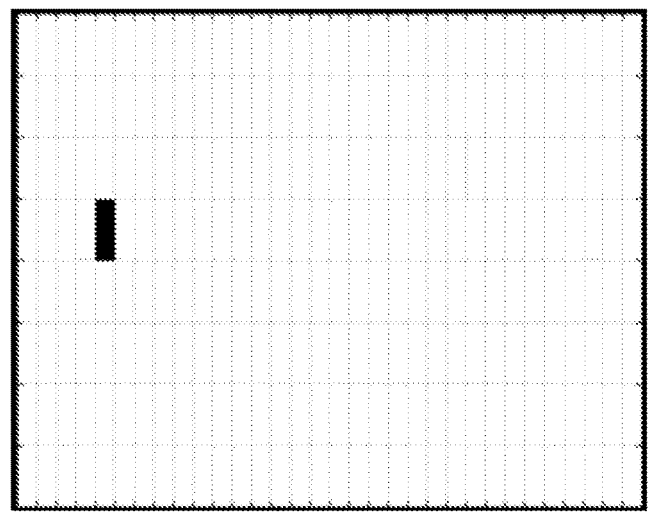
FIGS. 8A to 8C reproduce the images of FIGS. 7A to 7C in negative for clarity.
Figure 8B:
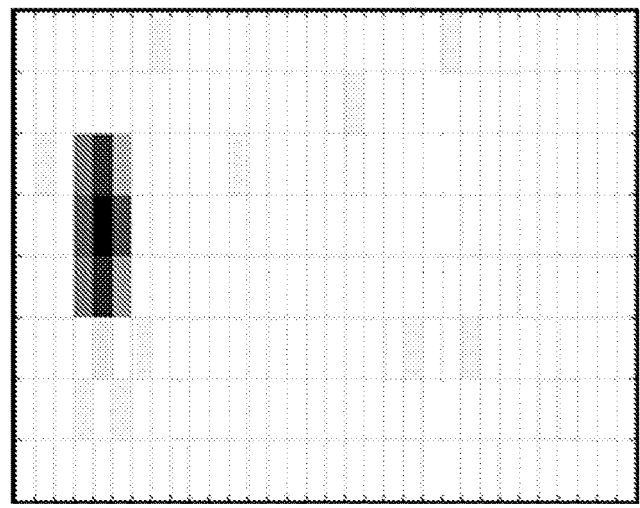
Figure 8C:
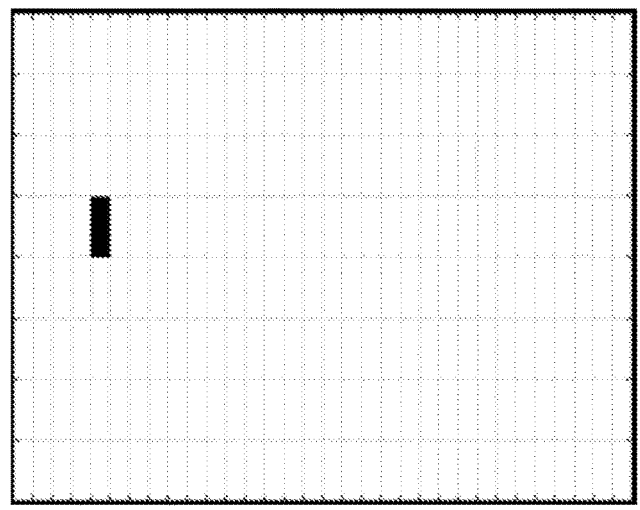

(Note that FIGS. 8A to 8C reproduce the images of FIGS. 7A to 7C, but in negative for clarity.)

Figure 9A:
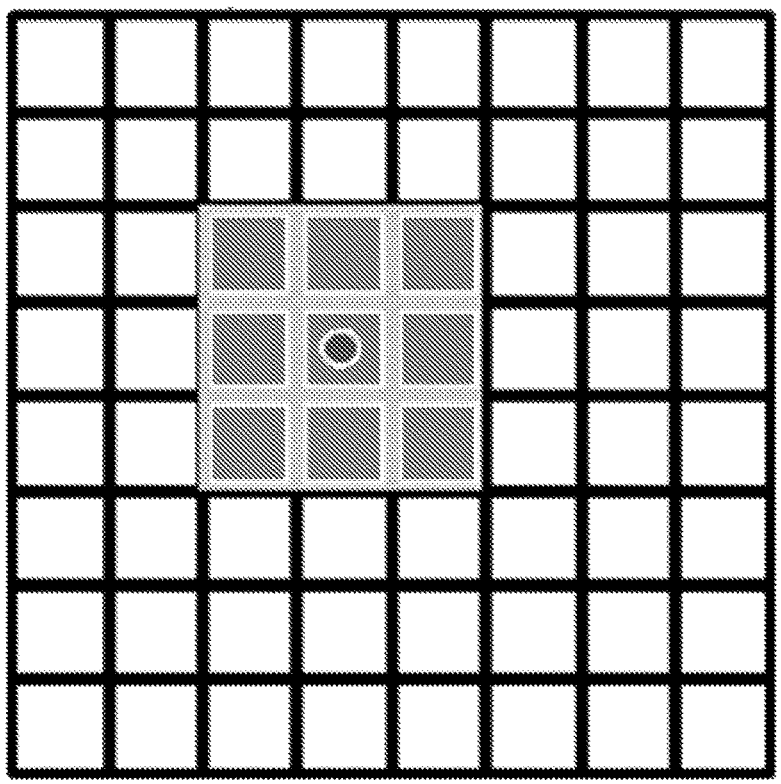
FIGS. 9A and 9B illustrate the difference in image response of the imaging system of FIG. 1 for different locations of the point radiation source, FIG. 9A depicting an image PSF/blur (grey) when a point source (dot) is central to the aperture, FIG. 9B depicting an image PSF/blur (grey) when a point source (dot) is at the corner of the aperture.
Figure 9B:
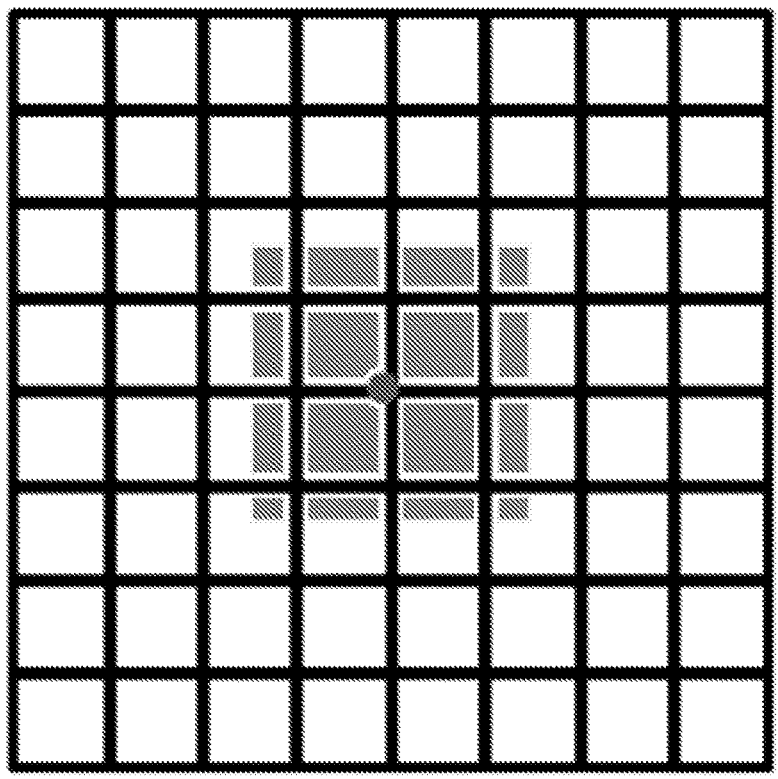

The use of larger sensors may, counter-intuitively, enable a higher angular resolution to be obtained through asymmetries in the detected response. The radiation source position in the aperture field of view will have different contributions to the apertures nearest neighbours. For example, FIGS. 9A and 9B illustrate the difference in image response for different locations of the point radiation source. FIG. 9A depicts an image PSF/blur (grey) when a point source (dot) is central to the aperture, while FIG. 9B depicts an image PSF/blur (grey) when a point source (dot) is at the corner of the aperture.

The 12 partially shaded pixels of FIG. 9B reflect that these pixels would not have as many counts as the four fully shaded pixels. Such a detector response or Point Spread Function (PSF) can be measured or simulated using radiation transport simulation software (i.e. Geant4).

5. Mask

Advantageously, the mask may but need not have tapered apertures. The dual mask approach of WO 2015/176115 discloses a mask apparatus employs tapered apertures in order to maintain a consistent FOV for each aperture, but this is not essential with the single mask approach of the present invention.

As discussed, the closed aperture locations of the mask modulate the incoming radiation. This modulation can occur through attenuation of the incoming signal or through scattering away the incoming signal. For example, high density and high atomic number materials like tungsten and lead are required to attenuate gamma-rays. Low atomic number materials would have a higher scattering cross-section and could therefore modulate the incoming signal through the Compton scatter interaction. For neutrons, the mask material should have a high neutron cross-section. Neutron mask materials may include but not be limited to Boron, Cadmium and materials with a high hydrogen content.

The mask may be considered an active mask in which the closed aperture locations are different detector elements. This active mask may be used, in conjunction with one or more central sensors 14, to produce both compressive gamma-ray images and Compton gamma-ray images. For this case, the active mask and the central detector use the kinematics of Compton scattering in order to locate the origin of the gamma-rays.

6. System Configurability

An advantage of the design of imaging system 10 is that it allows the system to be reconfigured. For example, higher or lower resolution masks 16 could be substituted for applications that require different angular resolutions. Different size sensors 14 may be substituted depending on the operational dose rate requirements. For example, for higher operational dose rates, smaller sensors 14 may be used.

7. Different Basis

Different image scenarios may perform better in a different basis. The basis that may be used include: canonical, wavelet, curvelet, discrete cosine transform, Fourier or any dictionary learned basis. The basis employed may be a combination of any of the domains previously mentioned or additional bases that have not been mentioned in this instance. A dictionary learned basis can be trained and may be optimal for the problem at hand. A set of measurements may be reconstructed by using several different bases (domains) in parallel. This may have the advantage of allowing an end-user or intelligent software to pick the best reconstructed image. The choice of basis may change during the measurement process. For more or less complex scenes, the basis may be changed on the fly and will therefore allow the optimum basis to be used.

8. Sub Aperture Mask Movements

Increased image angular resolution can be achieved by rotating mask 16 (in the illustrated and other embodiments) by angles less than that subtended by an individual aperture. Angular resolution can be doubled by considering each aperture (around the respective axis of rotation) as two adjacent identical apertures and rotating each mask by half aperture steps. Increasing resolution is not limited to doubling by half aperture steps: quadrupling the resolution can be achieved by angular steps corresponding to a quarter of a single aperture. This can be extended effectively to arbitrarily small angular resolutions by rotating mask 16 by any fractional movement that motor resolution will allow.

9. Automation (Phase Transition Simulations, Sparsity Metrics, Image Quality Metrics)

In practical applications, a user may have no knowledge of the sparsity of the scene signal that is being measured with imaging system 10. System 10 is adapted to determine the level of sparsity and control the measurement process. In this case the measurement process is the number of required measurements and the measurement time. Simulations of the performance of imaging system 10, in conjunction with a number of metrics that monitor the measured data and reconstruction process, can be used to predict and control the measurement process. The following provides details on the compressive imaging simulations and some of the metrics that can be used.

a. Phase Transition Simulations

Figure 10:
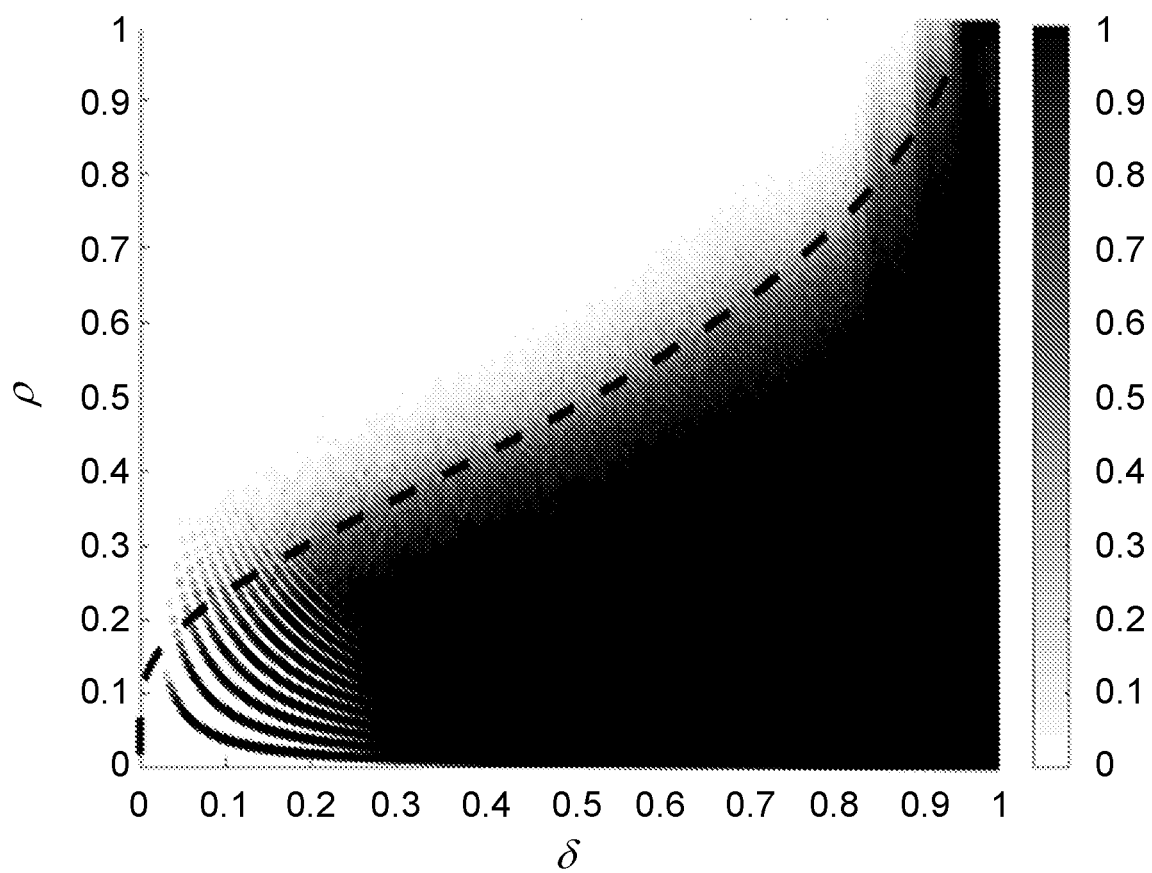
FIG. 10 depicts a phase transition diagram for phi matrix ensemble, as employed by the imaging system of FIG. 1.

For a Gaussian measurement matrix, Donoho and Tanner have previously shown the existence of a phase transition, representing a sudden change in the probability of a successful signal recovery from 0 to 1 [5, 6, 7]. Donoho and Tanner have subsequently developed the Universality Hypothesis, which states that many families of random matrices will also exhibit the same phase transition behaviour as the Gaussian ensemble when reconstructed through $l_1$ minimisation [8]. These phase transitions are displayed on a phase diagram, with an example shown in FIG. 10, which is a phase transition diagram for phi matrix ensemble. The crosspolytope function is also superimposed as a dashed black curve. The vertical axis of FIG. 10, $\rho=k/n$, represents the sparsity fraction where k is the number of non-zero values and n is the number of linear measurements. The horizontal axis, $\delta=n/N$, represents the undersampling fraction where N is the initial signal length. The width of the transition zone has been shown to be proportional to N, with the width of the zone tending to zero as $N \to \infty$ [8]. The superimposed dashed curve shown in FIG. 10 is the crosspolytope function: this convex polytope is derived from combinatorial geometry and is seen to roughly mark the location of the phase transition for successful recovery.

The method for producing the phase diagrams follows closely from Monajemi et al. [9]. The length of the initial signal represents the number of apertures in the mask. Subsequently, sampling is only required for combinations of n and k, subject to the constraint $0<\rho \leq 1$. This constraint is enforced since, for any situation where $\rho>1$ (i.e. where k>n), you would never be able to accurately reconstruct the original image. For each value of k=1:N, a signal with k non-zero elements is randomly generated, and CS techniques were used to attempt to accurately reconstruct this signal using n=1:256 number of measurements. The reconstruction process is repeated for 100 trials of every k, n combination and the amount of times the reconstruction was successful is recorded. The recovery of the signal is considered a success if the relative error between the reconstructed and original signal is less than some threshold level (for example 0.5), otherwise it is considered a failure. The equation used for the relative error was:

$$\text{rel\_err} = \frac{\|x_0 - x_1\|_2}{\|x_0\|_2} \quad (6)$$

where $x_0$ is the original signal, $x_1$ is the reconstructed signal, $\|x\|_1$ is the L1 norm and $\|x\|_2$ is the L2 norm.

The number of successful reconstructions compared to total number of trials for each k, n combination is then calculated, with this value corresponding to one data point on the phase diagram.

The resulting phase diagram for the phi matrix of the imaging system provides the number of measurements required to accurately reconstruct a signal for a given signal sparsity. Phase diagrams can be calculated for various different operating conditions, such as the signal intensity, the level of signal noise, detector geometry and the used basis (i.e. wavelets or curvelets), and stored in memory 36. Hence, by analysing a set of previously generated phase diagrams for imaging system 10, it is possible to set upper limits on how many measurements will be required to accurately reconstruct a signal with a certain sparsity value 100% of the time.

b. Sparsity Determination Metrics

The development of methods for determining the sparsity of a signal (by the sparsity determiner of processor 34), without any prior knowledge of the original signal, are of great value. One method that has been developed for determining the sparsity is through the use of the equation $$s(x) := \frac{\|x\|_1^2}{\|x\|_2^2}, \quad (7)$$

which always satisfies $1 \leq s(x) \leq N$ for any non-zero x [10, 11]. The norm in Equation 7. $\|x\|_\alpha$, is defined as $$\|x\|_\alpha := (\Sigma_{i=1}^n |x_i|^\alpha)^{1/\alpha}. \quad (8)$$

With no noise, $\|x\|_0$ (the $l_0$ norm) would be the ideal quantity for calculating sparsity since it simply counts the number of non-zero values in a signal, regardless of magnitude. This will, however, result in the $l_0$ norm being highly unstable to noise and therefore not of practical use in the real world [10, 11]. Equation 1 resolves this downfall by remaining stable to the existence of noise in the original signal, thus providing a valuable measure for sparsity.

Equation 7 is a special case of a family of entropy based sparsity measures ([10]), with the equation in generalised form given as:

$$s_\alpha(x) = \left(\frac{\|x\|_\alpha}{\|x\|_1}\right)^{\frac{\alpha}{1-\alpha}}. \quad (9)$$

where parameter a controls the amount of weighting placed on small values in the signal (i.e. noise) when calculating the sparsity. As the value of a increases, the amount of weighting placed on small values decreases [10].

An alternative method for determining the sparsity of a signal is by using the Gini Index [12, 13, 14]. The Gini index was initially introduced as a measure of the inequality of wealth in economics [14], but the usefulness of this index in terms of sparsity has also been previously illustrated [12, 13]. The equation for the Gini Index is given by:

$$s_{Gini}(x) = 1 - 2\sum_{k=1}^{N} \frac{|x_k|}{\|x\|_1}\left(\frac{N-k+\frac{1}{2}}{N}\right), \quad (10)$$

where the data x must be in ascending order, $x_1 \leq x_2 \leq x_3 \leq \ldots \leq x_N$.

The present embodiment uses one of the sparsity determination metrics described above or any other metric that can determine or estimate the sparsity in the measured signal. The present embodiment may use Equation (9), with α set to 3, due to its stability and performance over all sparsity and noise levels. The present method determines/estimates the sparsity level after each measurement and track this value as a function of the measurement number. Monitoring the convergence of the sparsity determination metric may provide a confidence level with which the sparsity estimate is given. The subsequent small variation in the sparsity estimate can indicate that an accurate sparsity estimate has been reached.

c. MSE Metric

This metric is used to track the evolution of the mean squared error (MSE) of reconstructed images as the number of measurements progresses, tracking the MSE between the most recent image solution and the image solution excluding the most recent, and/or several of the most recent measurements from the solution. This effectively provides information on how much the image solution is changing as additional information is collected through further measurements. The MSE metric can be used to determine the likelihood, and therefore confidence, that the correct solution has been reached when the mean squared error between the current solution and a previous solution is below a particular threshold.

d. Flow Diagram

Figure 11A:
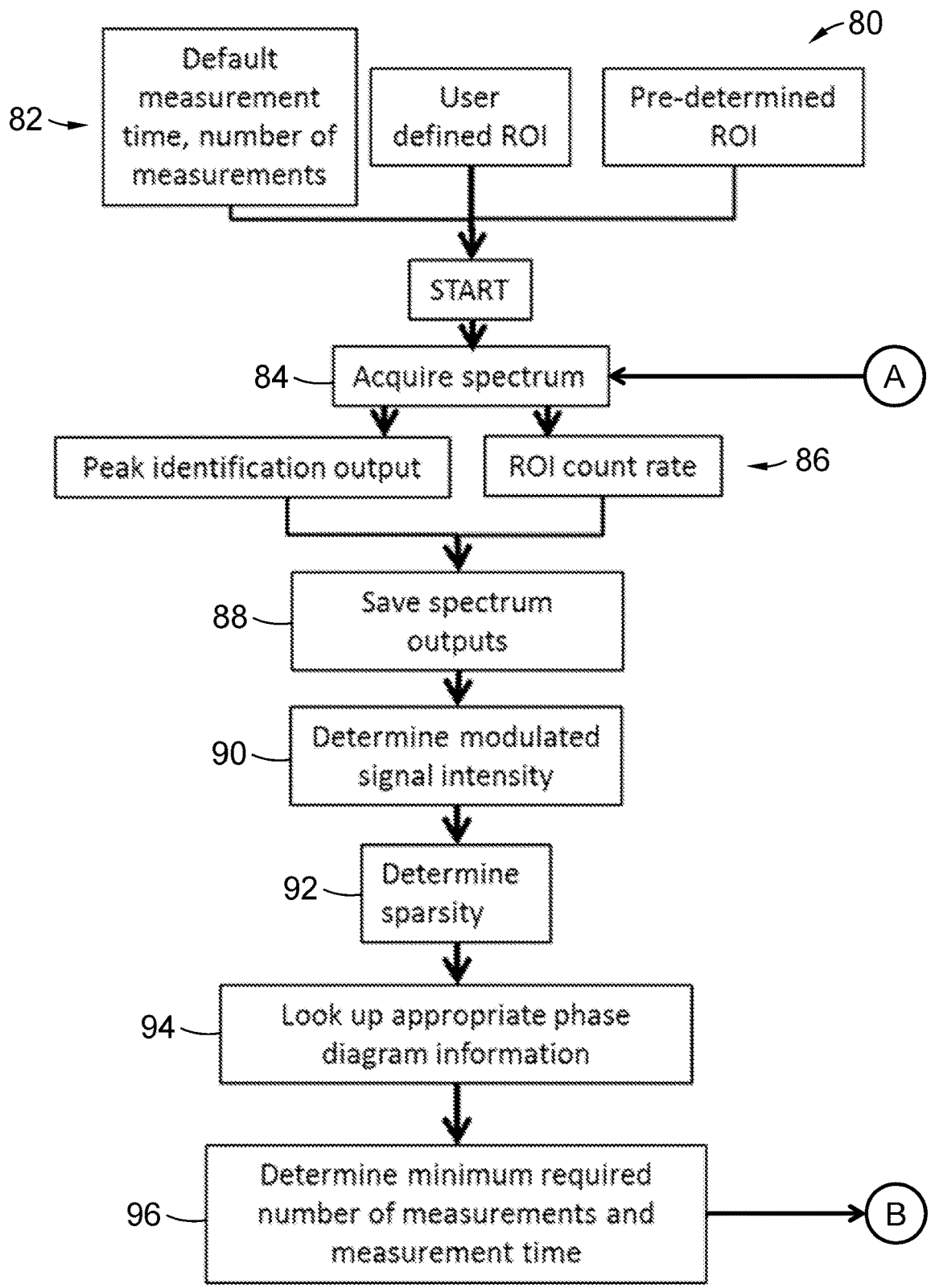
FIGS. 11A and 11B show a flow diagram that illustrates how the metrics and phase diagram information may be used in the control of an adaptive measurement process according to an embodiment of the present invention.
Figure 11B:
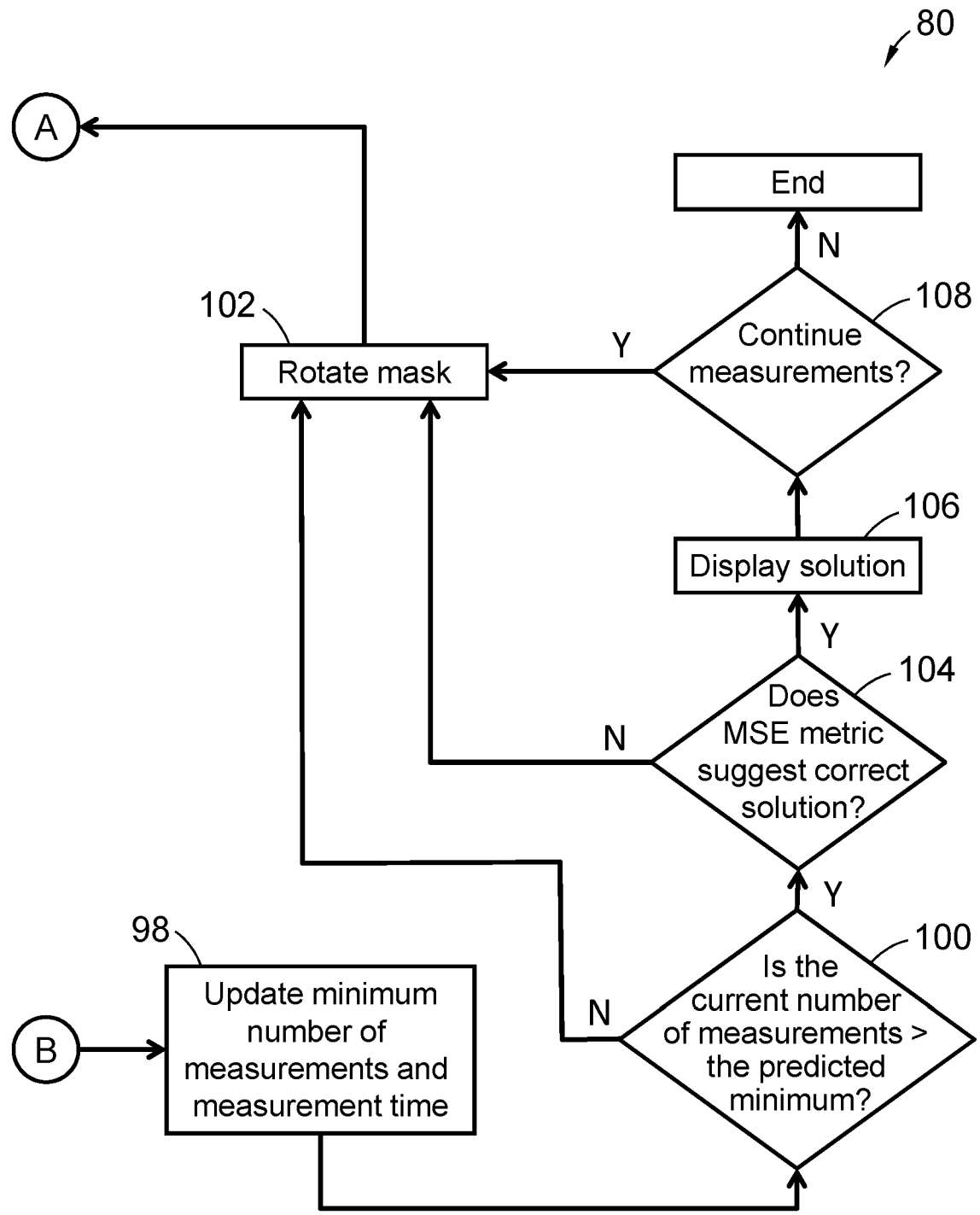

FIGS. 11A and 11B show a flow diagram 80 that illustrates how the metrics and phase diagram information may be used in the control of an adaptive measurement process according to an embodiment of the present invention.

Referring to FIGS. 11A and 11B, at step 82 processor 34 reads default measurement time and number of measurements from memory 36, and imports either a pre-determined ROI or a user-defined ROT. Processing proper then commences.

At step 84, a spectrum is acquired under the control of the spectrum acquirer, and—at step 86—the peak searcher and ROT counter perform peak identification and determine the ROT count rate respectively. At step 88, the spectrum outputs from the previous step (including the actual spectrum, the peak identification, the ROT count rate, total counts, total count rate and ROI total counts) are saved to memory 36, and at step 90 the intensity determiner of processor 34 determines the modulated signal intensity.

At step 92, the sparsity determiner of processor 34 determines the sparsity, and at step 94, the appropriate phase diagram information is imported from memory 36. At step 96, the adaptive measurer of processor 34 determines the minimum required number of measurements and the measurement time, and—at step 98—the previously imported defaults of minimum required number of measurements and measurement time are updated.

At step 100, it is determined whether the current number of measurements is greater than the predicted number. If not, processing continues at step 102 where the mask is rotated. Processing then continues at step 84.

If, at step 100, it is determined that the current number of measurements is greater than the predicted number, processing continues at step 104 where it is determined whether the MSE metric suggests the correct solution. If not, processing continues at step 102 where the mask is rotated, then continues at step 84.

If, at step 104, it is determined that the MSE metric suggests the correct solution, processing continues at step 106 where the solution is displayed to user interface 32. At step 108, the user is prompted to indicate whether measurements should continue. If the user indicates that measurements should continue, processing continues at step 102 where the mask is rotated, then processing continues at step 84. If at step 108 the user indicates that measurements should not continue, processing ends.

10. Applications of the Invention

Applications may include, but are not be limited to: the Nuclear Industry (e.g. reactor decommissioning characterisation activities, safety monitoring/surveying, waste characterisation), Defence, National Security, first responder applications, the health industry (e.g. medical imaging, radiation safety monitoring, radiotherapy, particle therapy), gamma-ray/X-ray astronomy, any safety monitoring/surveying/radiation protection activity, the remote characterisation/detection of misalignments in charged particle accelerator beams (including electrons and charged atoms/ions) or any other beams that can induce radiation or any facility that has a radiation emissions.

REFERENCES

1. D. L. Donohue, Compressed sensing, IEEE Trans Inf Theory 2(2006), 1289-1306
2. E. J. Candes, J. Romberg, T. Tao, Robust Uncertainty Principles: Exact Signal Reconstruction from Highly Incomplete Frequency Information, IEEE Trans Inf Theory, 52(2006), 489-509
3. Daubechies, M. Defrise, C. D. Mol. An iterative thresholding algorithm for linear inverse problems with a sparsity constraint, Communications on pure and applied mathematics, 57 (2004), 1413-1457
4. M. A. T. Figueiredo, R. D. Nowak, S. J. Wright, Gradient Projection for Sparse Reconstruction: Application to Compressed Sensing and Other Inverse Problems, IEEE Journal of Selected Topics in Signal Processing 1(2007), 586-597
5. D. L. Donoho, "For most large underdetermined systems of equations, the minimal 11-norm solution is also the sparsest solution", Commun. Pure Appl. Math, 29(6) (2006), 797-829
6. D. L. Donoho, "For most large underdetermined systems of equations, the minimal 11-norm near-solution approximates the sparsest near-solution", Commun. Pure Appl. Math, 59. (7) (2006), 907-934
7. D. L. Donoho, and J. Tanner. "Sparse nonnegative solution of underdetermined linear equations by linear programming", Proc. Nat. Acad. Sci., 102(27) (2005), 9446-9451
8. D. L. Donoho, and J. Tanner, "Observed universality of phase transitions in high-dimensional geometry, with implications for modern data analysis and signal processing", Phil. Trans. R. Soc. A., 367(1906) (2009), 4273-4293

9. H. Monajemi, S. Jafarpour, and M. Gavish, Stat 330/CME 362 Collaboration, and D. L. Donoho, "Deterministic matrices matching the compressed sensing phase transitions of Gaussian random matrices," Proc. Nat. Acad. Sci. 110 (2013), 1181-1186
10. M. E. Lopes, "Unknown Sparsity in Compressed Sensing: Denoising and Inference". IEEE Transactions on Information Theory, f)(9) (2016), 5145-5166
11. M. E. Lopes, "Estimating unknown sparsity in compressed sensing", Proc. 30th International Conference on Machine Learning. (2013), 217-225
12. N. Hurley and S. Rickard, "Comparing measures of sparsity," IEEE Transactions on Information Theory. 55(10) (2009), 4723-4741
13. S. Rickard and M. Fallon, "The Gini index of speech." in Proc. Conf. Inf. Sci. Syst., Princeton, N.J., 2004.
14. C. Gini, "Measurement of inequality of incomes," Economic Journal, 31 (1921), 124-126

Modifications within the scope of the invention may be readily effected by those skilled in the art. It is to be understood, therefore, that this invention is not limited to the particular embodiments described by way of example hereinabove.

In the claims that follow and in the preceding description of the invention, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Further, any reference herein to prior art is not intended to imply that such prior art forms or formed a part of the common general knowledge in any country.

The invention claimed is:

1. A mask for use in compressed sensing of incoming radiation, comprising:
    a material that modulates an intensity of incoming radiation;
    a plurality of mask aperture regions; and
    one or more axes of rotational symmetry with respect to the plurality of mask aperture regions;
    wherein each mask aperture region comprises at least one mask aperture that allows a higher transmission of the incoming radiation relative to other portions of each mask aperture region, a relative transmission being sufficient to allow a reconstruction of compressed sensing measurements, and
    each of the at least one mask aperture has a shape that provides a symmetry under a rotation about the one or more axes of rotational symmetry; and
    a mutual coherence of a sensing matrix generated by a rotation of the plurality of mask aperture regions is less than one.

2. The mask as claimed in claim 1, wherein the mutual coherence of the sensing matrix is expressed as $\mu(\varphi)$, where:

$$\mu(\varphi) = \max_{i \neq j} |\varphi_i^T \varphi_j|,$$

where $\varphi$ is a matrix containing $M \times N^2$ rows of the sensing matrix, arising from M measurements and an $N^2$ pixel image, and $\varphi_i$ and $\varphi_j$ are columns of $\varphi$.

3. The mask as claimed in claim 1, wherein the mutual coherence of the sensing matrix is expressed as $\mu(\varphi)$, where:

$$\mu(\varphi) = \max_{i \neq j} \frac{|\varphi_i^T \varphi_j|}{\|\varphi_i\|_2 \|\varphi_j\|_2},$$

where $\varphi$ is a matrix containing $M \times N^2$ rows of the sensing matrix, arising from M measurements and an $N^2$ pixel image, and $\varphi_i$ and $\varphi_j$ are columns of $\varphi$.

4. The mask as claimed in claim 3, wherein the mutual coherence of the sensing matrix is a minimized mutual coherence.

5. The mask as claimed in claim 3, further comprising:
    (i) a cube or other Platonic solid,
    (ii) a truncated icosahedral or other Archimedean solid,
    (iii) a cylinder, or
    (iv) a sphere.

6. The mask as claimed in claim 1, wherein the mutual coherence of the sensing matrix is a minimized mutual coherence.

7. The mask as claimed in claim 1, further comprising:
    (i) a cube or other Platonic solid,
    (ii) a truncated icosahedral or other Archimedean solid, or
    (iii) a cylinder.

8. The mask as claimed in claim 1, further comprising a sphere.

9. A detector for compressed sensing of incoming radiation, comprising:
    a mask as claimed in claim 1;
    one or more radiation sensors within the mask and sensitive to the incoming radiation; and
    a drive for rotating the mask about at least one of the one or more axes of rotational symmetry.

10. The detector as claimed in claim 9, further comprising:
    a plurality of radiation sensors; and
    a radiation shield arranged to mutually shield the plurality of radiation sensors.

11. The detector as claimed in claim 9, wherein the mutual coherence of the sensing matrix is expressed as $\mu(\varphi)$, where:

$$\mu(\varphi) = \max_{i \neq j} |\varphi_i^T \varphi_j|, \text{ or } \mu(\varphi) = \max_{i \neq j} \frac{|\varphi_i^T \varphi_j|}{\|\varphi_i\|_2 \|\varphi_j\|_2},$$

where $\varphi$ is a matrix containing $M \times N^2$ rows of the sensing matrix, arising from M measurements and an $N^2$ pixel image, and $\varphi_i$ and $\varphi_j$ are columns of $\varphi$; and
    the mutual coherence of the sensing matrix is a minimized mutual coherence.

12. The detector as claimed in claim 9, wherein the mutual coherence of the sensing matrix is expressed as $\mu(\varphi)$, where:

$$\mu(\varphi) = \max_{i \neq j} |\varphi_i^T \varphi_j|, \text{ or } \mu(\varphi) = \max_{i \neq j} \frac{|\varphi_i^T \varphi_j|}{\|\varphi_i\|_2 \|\varphi_j\|_2},$$

where $\varphi$ is a matrix containing $M \times N^2$ rows of the sensing matrix, arising from M measurements and an $N^2$ pixel image, and $\varphi_i$ and $\varphi_j$ are columns of $\varphi$; and
    the mask further comprises:
    (i) a cube or other Platonic solid,
    (ii) a truncated icosahedral or other Archimedean solid,
    (iii) a cylinder, or
    (iv) a sphere.

13. A radiation detection method, comprising:
   making compressed sensing measurements with a detector as claimed in claim 9.

14. The radiation detection method as claimed in claim 13, further comprising any one of more of:
   decommissioning a nuclear reactor, radiation safety monitoring or surveying, characterizing radioactive waste, security or defense monitoring, medical imaging, conducting a radiotherapy, conducting a particle therapy, conducting gamma-ray astronomy, conducting X-ray astronomy, remotely characterizing or detecting misalignments in a charged particle accelerator beam or in a radiation inducing beam, or enforcing border security.

15. An imaging method, comprising:
   imaging with a detector as claimed in claim 9.

16. The imaging method as claimed in claim 15, further comprising:
   making optical images and/or infrared images of a field of view of the detector or a portion thereof; and
   overlaying the optical images and/or infrared images and an image generated with the detector.

\* \* \* \* \*